Aug. 9, 1927.
L. S. LACHMAN
1,638,635
GIRDER
Original Filed Nov. 9, 1923
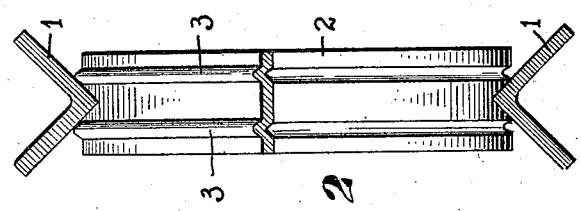
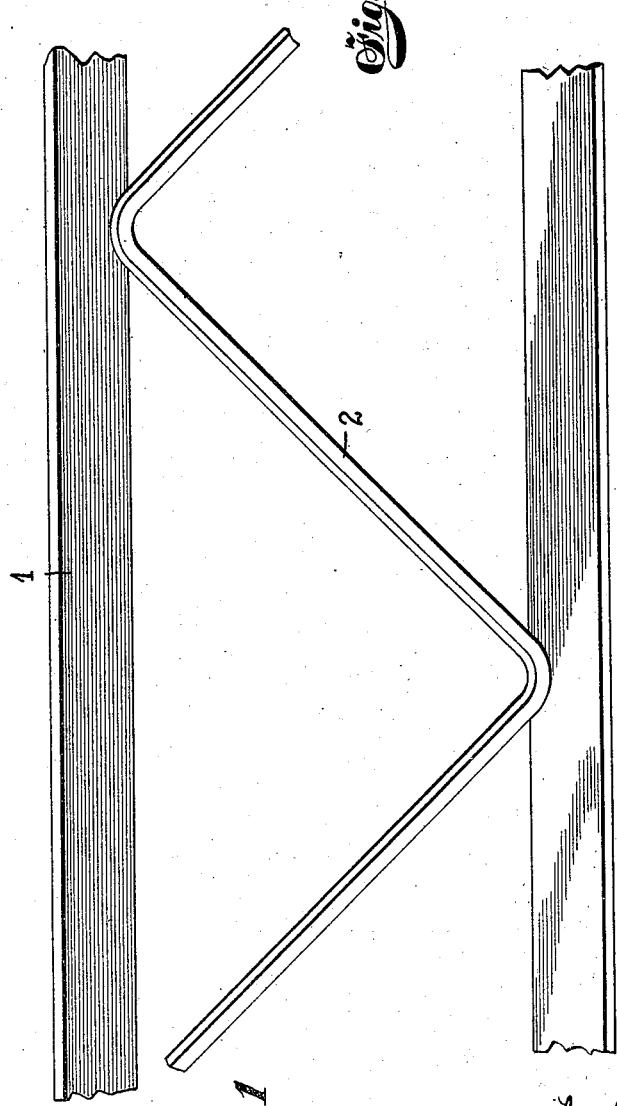
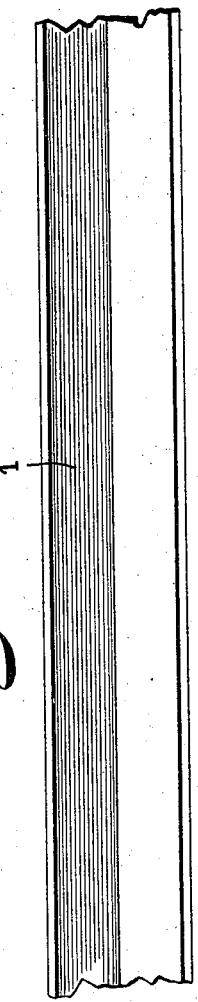
Inventor
Laurence S. Lachman.
By his Attorneys
Townsend & Decker.

Patented Aug. 9, 1927.

1,638,635

UNITED STATES PATENT OFFICE.

LAURENCE S. LACHMAN, OF NEW YORK, N. Y., ASSIGNOR TO UNIVERSAL ELECTRIC WELDING COMPANY, A CORPORATION OF NEW YORK.

GIRDER.

Application filed November 9, 1923, Serial No. 673,657. Renewed May 5, 1927.

My invention relates to a construction of electrically welded girders, beams or the like and more particularly to the construction of a skeleton type wherein the members forming struts or braces connecting the two longitudinals consist of a bar or bars instead of a plate. The object of my invention is to provide a girder or like structure which will afford great stiffness or strength to resist deforming forces exerted in the general plane of the girder as well as twisting or distortioning forces exerted in a direction transverse to the general plane of the girder and by a construction which shall be very strong for the amount of material employed and which may likewise be readily made up by the use of electrical resistance and pressure method of welding.

To these ends my invention consists in the construction of a girder or the like hereinafter described and more particularly specified in the claims.

In the accompanying drawings:

Fig. 1 is a side elevation of a portion of a girder embodying my invention.

Fig. 2 is a vertical cross section of Fig. 1 on the line 2—2.

Fig. 3 is a top view of the construction.

Referring to the drawings:

Each longitudinal or the upper and lower members of the girder consists of an angle bar 1. These longitudinals are disposed with the outer angles projecting upwardly and downwardly respectively or in a direction towards one another. Between them and in the same general plane is located a connecting strut, brace or diagonal 2 preferably formed by bending a flat bar or plate into zig-zag shape as shown thereby cheapening the construction and lessening the number of parts to be handled. The member 2 consists of a plate or bar disposed with the plane of said bar transverse to the general plane of the girder or structure and is preferably of such width as to be embraced within or to be flush with the transverse edges of the members 1. Said plate 2 is provided preferably with one or more longitudinal ridges 3 and its flat outer face at the bends is engaged by and welded to the corners or outer edges of the angle bars 1 as shown. The angles of said bars 1 as thus presented and arranged in relation to the flat plate 2 afford zones or points of limited contact area which are useful in setting up the electric resistance when the parts are assembled between welding dies which furnish electrical current and pressure and applied to weld the parts together as well understood in the art. The dies which engage the bars 1 are preferably formed to set in the inner angle and by their shape and co-operation with the bars 1 are automatically centered or located when the pressure is applied. As will be understood the electrical weld is of a homogeneous character, involving the metal of the outside surface of the bends and the corner or outside angle of the bars 1. Usually the outside corner or outside angle becomes embedded in the surface of the bar 2 to a greater or less extent and the outside faces of the bar 1 are preferably caused by the pressure to seat themselves upon the ridges 3. By these means the stability and strength of the structure is enchanced at the joint. As will be seen, the angle bars 1, owing to their shape and disposition not only afford great resistance to compression but also, by their relative disposition and arrangement, with relation to the plate zig-zag 2 contribute to ease in manufacturing by electrically welding the parts together. Furthermore, the plate 2 being disposed as described effectually resists forces tending to distort or deform the structure in a plane transverse to the general plane thereof, while bars 1 owing to their shape contribute to that resistance both by reason of their shape and by reason of their being securely anchored to the plate 2 by engagement with the ridges thereon and by the electrical weld formed between the ridges.

What I claim as my invention is:

1. A skeleton girder comprising parallel angle members, the apices of which oppose each other, a zigzag member provided with projections spaced laterally to each other, the angle members being electrically welded to the bends of the zigzag members at their apices so that the sides of an angle member seat upon the projections.

2. A skeleton girder comprising parallel angle members, the apices of which oppose each other, a zigzag member provided with parallel ribs, the angle members being electrically welded at their apices to the bends of the zigzag member so that the sides of an angle member seat upon the ribs.

3. A skeleton girder comprising parallel angle members, the apices of which oppose each other, a zigzag member the plane of which is transverse to the general plane of the girder and provided with parallel ribs, the angle members being electrically welded at their apices to the bends of the zigzag member so that the ribs of an angle member seat upon the ribs.

Signed at New York in the county of New York and State of New York this 8th day of November, A. D. 1923.

LAURENCE S. LACHMAN.